(12) United States Patent
Kouyama et al.

(10) Patent No.: US 11,809,007 B2
(45) Date of Patent: Nov. 7, 2023

(54) OPTICAL COMPONENT HOUSING BOX

(71) Applicant: SUMITOMO ELECTRIC INDUSTRIES, LTD., Osaka (JP)

(72) Inventors: Yoshihiro Kouyama, Komaki (JP); Takayuki Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 383 days.

(21) Appl. No.: 17/327,003

(22) Filed: May 21, 2021

(65) Prior Publication Data
US 2021/0389538 A1      Dec. 16, 2021

(30) Foreign Application Priority Data

Jun. 12, 2020   (JP) ................................ 2020-102367

(51) Int. Cl.
*G02B 6/44*          (2006.01)
(52) U.S. Cl.
CPC .................................. *G02B 6/4441* (2013.01)
(58) Field of Classification Search
CPC .................................................. G02B 6/4441
See application file for complete search history.

(56) References Cited

U.S. PATENT DOCUMENTS

| | | | | |
|---|---|---|---|---|
| 2008/0043451 | A1* | 2/2008 | Sato ..................... | H05K 7/1461 361/802 |
| 2011/0274402 | A1* | 11/2011 | Giraud ................. | G02B 6/4452 385/135 |
| 2022/0078532 | A1* | 3/2022 | Shearman ............. | H04Q 1/025 |

FOREIGN PATENT DOCUMENTS

| | | |
|---|---|---|
| JP | 2009-147109 A | 7/2009 |
| JP | 2010-168768 A | 8/2010 |
| JP | 2014-027082 A | 2/2014 |
| JP | 3214021 U | 12/2017 |
| JP | 2020-079839 A | 5/2020 |

* cited by examiner

*Primary Examiner* — Joseph L Williams
(74) *Attorney, Agent, or Firm* — Oliff PLC

(57) ABSTRACT

An optical component housing box including: a housing; and a bracket attached to a side surface of the housing, the bracket including: a fixing portion fixed to the housing; an attachment portion configured to be screwed into one of a plurality of screw holes opened in support pillars provided on both sides of a rack; and a hinge portion, wherein when attaching the optical component housing box to the rack, after the bracket passes between the support pillars by the hinge portion being closed and the attachment portion falling to a fixing portion side as the housing is moved into the rack from a side opposite to a direction in which the attachment portion is to be screwed to the support pillar, the attachment portion is attached to the support pillar in a state of standing up relative to the fixing portion.

4 Claims, 8 Drawing Sheets

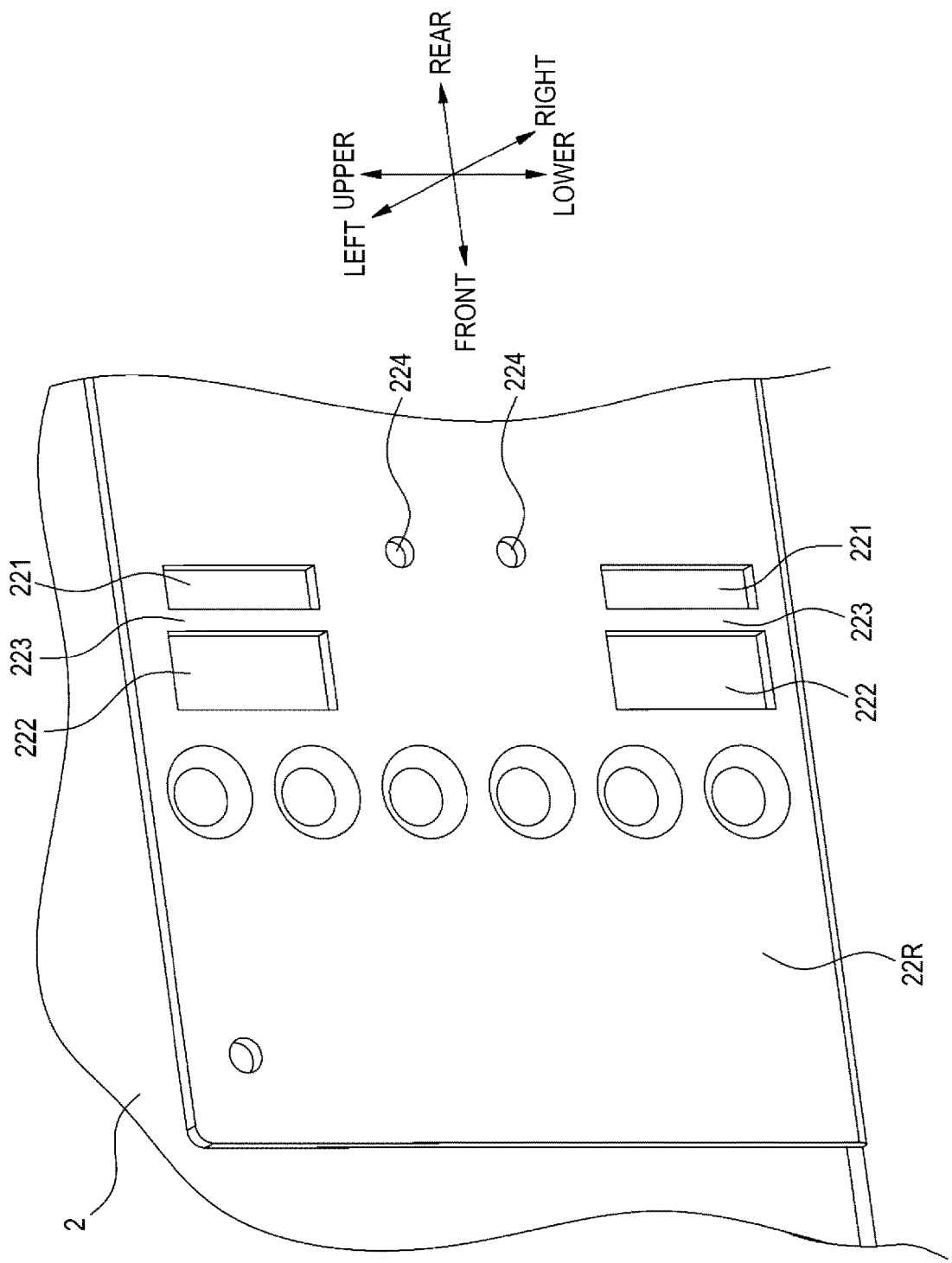

OPTICAL COMPONENT HOUSING BOX

CROSS-REFERENCE TO RELATED APPLICATIONS

This application is based upon and claims the benefit of priority from prior Japanese patent application No. 2020-102367, filed on Jun. 12, 2020, the entire contents of which are incorporated herein by reference.

TECHNICAL FIELD

The present disclosure relates to an optical component housing box.

BACKGROUND ART

Patent Literatures 1 and 2 disclose a box-shaped optical component housing box or an optical connection unit configured to be housed in a rack (optical wiring board) disposed in a data center or the like. Patent Literatures 3 to 5 disclose a rack (frame member) in which an optical component housing box is housed. As disclosed in Patent Literature 3 and Patent Literature 5, a large number of screw holes are opened at equal intervals in a support pillar of the rack.
Patent Literature 1: JP-A-2020-79839
Patent Literature 2: Japanese Utility Model Registration No. 3214021
Patent Literature 3: JP-A-2009-147109
Patent Literature 4: JP-A-2010-168768
Patent Literature 5: JP-A-2014-027082

As disclosed in Patent Literatures 1 and 2, an L-shaped bracket is attached to a side surface of the optical component housing box. The L-shaped bracket is screwed into a screw hole provided in the support pillar of the rack so that the optical component housing box is attached to the rack. In this way, the L-shaped bracket is fixed in a state in which a part of the L-shaped bracket protrudes from the side surface of the optical component housing box in the related art. Accordingly, it is necessary to insert the optical component housing box from a front surface of the rack when attaching the optical component housing box to the rack, and there is a large restriction on a shape of the optical component housing box.

SUMMARY

An object of the present disclosure is to provide an optical component housing box in which there are few restrictions on a width dimension and an additional function when housing the optical component housing box in a rack.

According to an aspect of the present disclosure, there is provided an optical component housing box configured to be housed in a rack, the optical component housing box including: a housing in which an optical component is housed; and a bracket attached to a side surface of the housing, the bracket including: a fixing portion fixed to the housing; an attachment portion configured to be screwed into one of a plurality of screw holes opened in support pillars provided on both sides of the rack; and a hinge portion configured to move the attachment portion relative to the fixing portion, wherein when attaching the optical component housing box to the rack, after the bracket passes between the support pillars by the hinge portion being closed and the attachment portion falling to a fixing portion side as the housing is moved into the rack from a side opposite to a direction in which the attachment portion is to be screwed to the support pillar, the attachment portion is attached to the support pillar in a state of standing up relative to the fixing portion.

According to the present disclosure, it is possible to provide an optical component housing box in which there are few restrictions on a width dimension and an additional function when housing the optical component housing box in a rack.

BRIEF DESCRIPTION OF DRAWINGS

FIG. 5 is a perspective view of a side plate of the housing to which the bracket is to be attached.

DESCRIPTION OF EMBODIMENTS

Description of Embodiments of Present Disclosure

Figure 1:
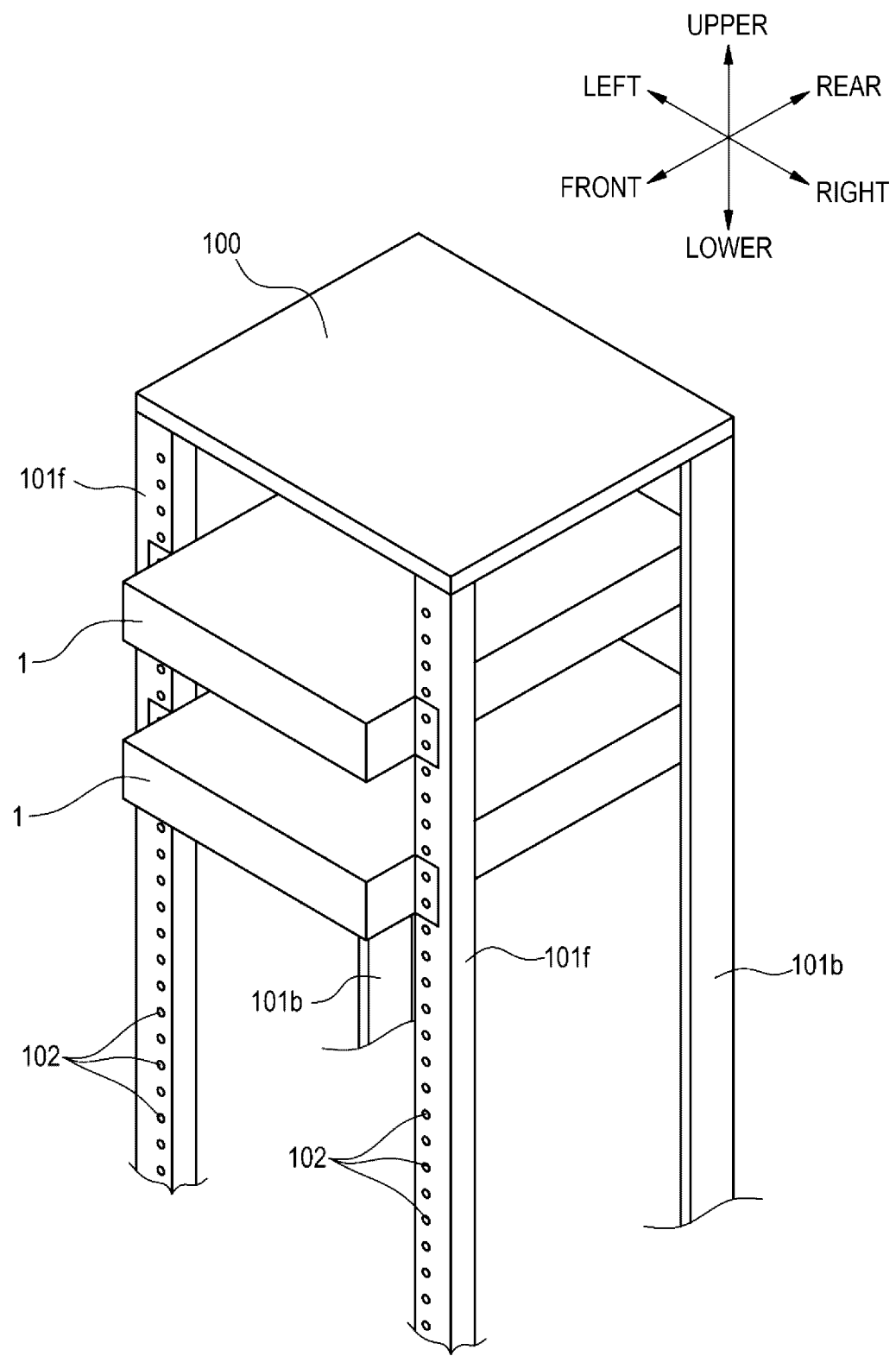
FIG. 1 illustrates an optical component housing box according to an embodiment of the present disclosure in a state of being housed in a rack.

First, aspects of the present disclosure will be listed and described.
(1) According to an aspect of the present disclosure, there is provided an optical component housing box configured to be housed in a rack, the optical component housing box including:
a housing in which an optical component is housed; and
a bracket attached to a side surface of the housing, the bracket including:
a fixing portion fixed to the housing;
an attachment portion configured to be screwed into one of a plurality of screw holes opened in support pillars provided on both sides of the rack; and
a hinge portion configured to move the attachment portion relative to the fixing portion,
wherein when attaching the optical component housing box to the rack, after the bracket passes between the support pillars by the hinge portion being closed and the attachment portion falling to a fixing portion side as the housing is moved into the rack from a side opposite to a direction in which the attachment portion is to be screwed to the support pillar, the attachment portion is attached to the support pillar in a state of standing up relative to the fixing portion.

According to the present disclosure, the optical component housing box can be moved into the rack from a side (usually a direction from a rear portion of the rack to a front portion) opposite to a direction (usually a direction from the front portion of the rack to the rear portion) in which the attachment portion of the bracket is to be screwed to the rack. Accordingly, for example, even when an optical component housing box has a shape in which the width on a rear surface side is larger than the width between support pillars of a rack or has a protruding shape on the rear surface side, the optical component housing box can be attached to the rack. Therefore, it is possible to provide an optical component housing box in which there are few restrictions on the width dimension and an additional function when housing the optical component housing box in a rack, and the workability of attaching the optical component housing box to the rack is improved.

(2) The attachment portion may include:
a flat plate-shaped attachment plate configured to be fixed to the rack; and
an engagement portion curved in a U shape from an end portion of the attachment plate on a housing side,
the housing may have an engagement hole engageable with the engagement portion, and
the engagement portion may not engage with the engagement hole when the hinge portion is closed and the attachment portion falls to the fixing portion side, and may engage with the engagement hole when the hinge portion is opened and the attachment portion stands up.

According to the present disclosure, since the engagement portion of the bracket engages with the engagement hole of the rack, a part of the weight of the housing of the optical component housing can be applied to the engagement portion, and the optical component housing box can be more reliably held by the rack than when the weight of the housing is received only by the fixing portion.

(3) The attachment portion may include at least one engagement portion.

According to the present disclosure, it is possible to sufficiently ensure the attachment strength of the housing to the rack.

(4) The hinge portion may have a spring structure that biases the attachment portion to stand up relative to the fixing portion.

According to the present disclosure, when the optical component housing box is inserted from the rack back surface and the bracket passes between the support pillars, the attachment portion can automatically fall down to the fixing portion side against the spring structure of the hinge portion, and the attachment portion can automatically stand up after the bracket passes between the support pillars. For this reason, the attachment workability can be improved particularly in a case where a worker works alone.

Details of Embodiments of Present Disclosure

A specific example of an optical component housing box according to an embodiment of the present disclosure will be described with reference to the drawings. Here, the present disclosure is not limited to the example but is disclosed by the scope of claims, and is intended to cover meanings equivalent to the scope of claims and all modifications within the scope.

FIG. 1 illustrates optical component housing boxes 1 housed in a rack 100. As illustrated in FIG. 1, the optical component housing boxes 1 are arranged in a stacked state in the rack 100 having, for example, a rectangular shape. The rack 100 includes, for example, a plurality of support pillars 101 (101f, 101b) at four corners. Each of the optical component housing boxes 1 arranged in the rack 100 is housed in a state of being fixed to the rack 100 by, for example, being screwed to the substantially L-shaped support pillars 101f disposed at left and right corners on a front side of the rack 100. The optical component housing box 1 is housed into the rack 100 from a rear side of the rack 100 relative to the rack 100. The optical component housing box 1 is inserted between the substantially I-shaped support pillars 101b disposed at left and right corners on a rear portion side of the rack 100, and is housed into the rack 100 from the rear side of the rack 100. The support pillars 101f at a front portion of the rack 100 are substantially L-shaped, whereas the support pillars 101b at a rear portion of the rack 100 are substantially I-shaped. For this reason, the width between the support pillars 101b on the rear side is larger than the width between the support pillars 101f on the front side.

The optical component housing box 1 is configured to be screwed to the support pillars 101f of the rack 100 from the front side of the rack 100 in a state of being housed in the rack 100. A plurality of screw holes 102 for screwing and fixing the optical component housing box 1 are opened at equal intervals in the support pillars 101f of the rack 100.

Figure 2:
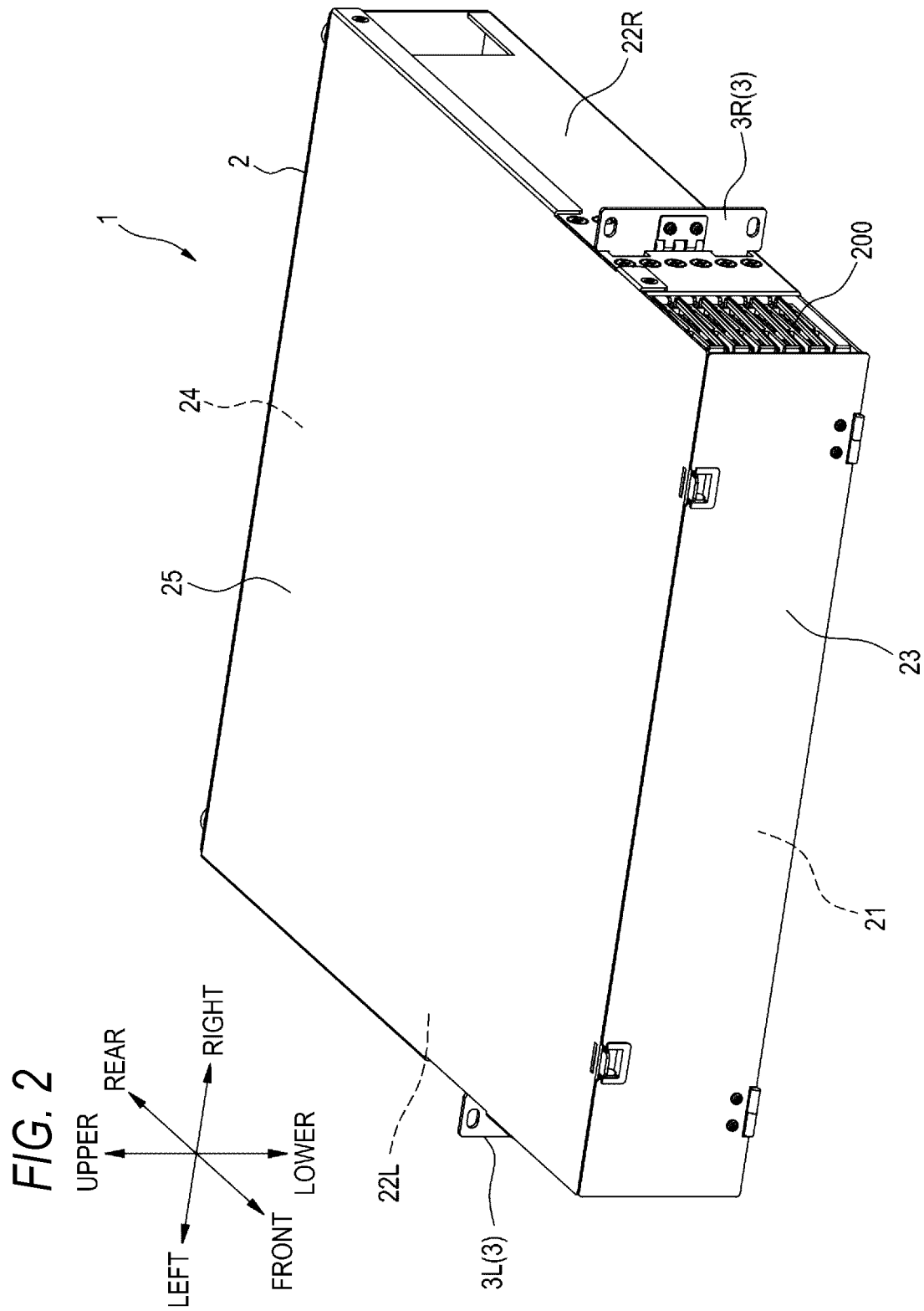
FIG. 2 is a perspective view of the optical component housing box.

FIG. 2 is a perspective view of the optical component housing box 1. The optical component housing box 1 is a substantially flat plate-shaped box body made of metal or a synthetic resin, in which various optical components 200 such as an optical demultiplexer, an optical multiplexer, and an optical switch are housed. As illustrated in FIG. 2, the optical component housing box 1 includes a housing 2, in which the optical components 200 are housed, and a pair of brackets 3 (3L, 3R) provided on side portions of the housing 2.

The housing 2 includes a bottom plate 21, side plates 22L, 22R standing on left and right sides of the bottom plate 21, a front plate 23 standing at a front portion of the bottom plate 21, a rear plate 24 standing at a rear portion of the bottom plate 21, and a top plate 25 provided to cover a space defined by the bottom plate 21, the side plates 22L, 22R, the front plate 23, and the rear plate 24. The optical components 200 are housed in the space defined by the bottom plate 21, the side plates 22L, 22R, the front plate 23, and the rear plate 24.

The pair of brackets 3 (3L, 3R) are respectively attached to the side plate 22L and the side plate 22R of the housing 2. The brackets 3 (3L, 3R) are attached to outer side surfaces of the side plates 22L, 22R. The brackets 3 (3L, 3R) stand up relative to the side plates 22L, 22R in a normal state in which no load is applied to the brackets 3 (3L, 3R) externally. That is, the optical component housing box 1 is fixed to the rack 100 by screwing the brackets 3 (3L, 3R), which stand up from the side plates 22L, 22R in a normal state, to the support pillars 101f of the rack 100.

Figure 3:
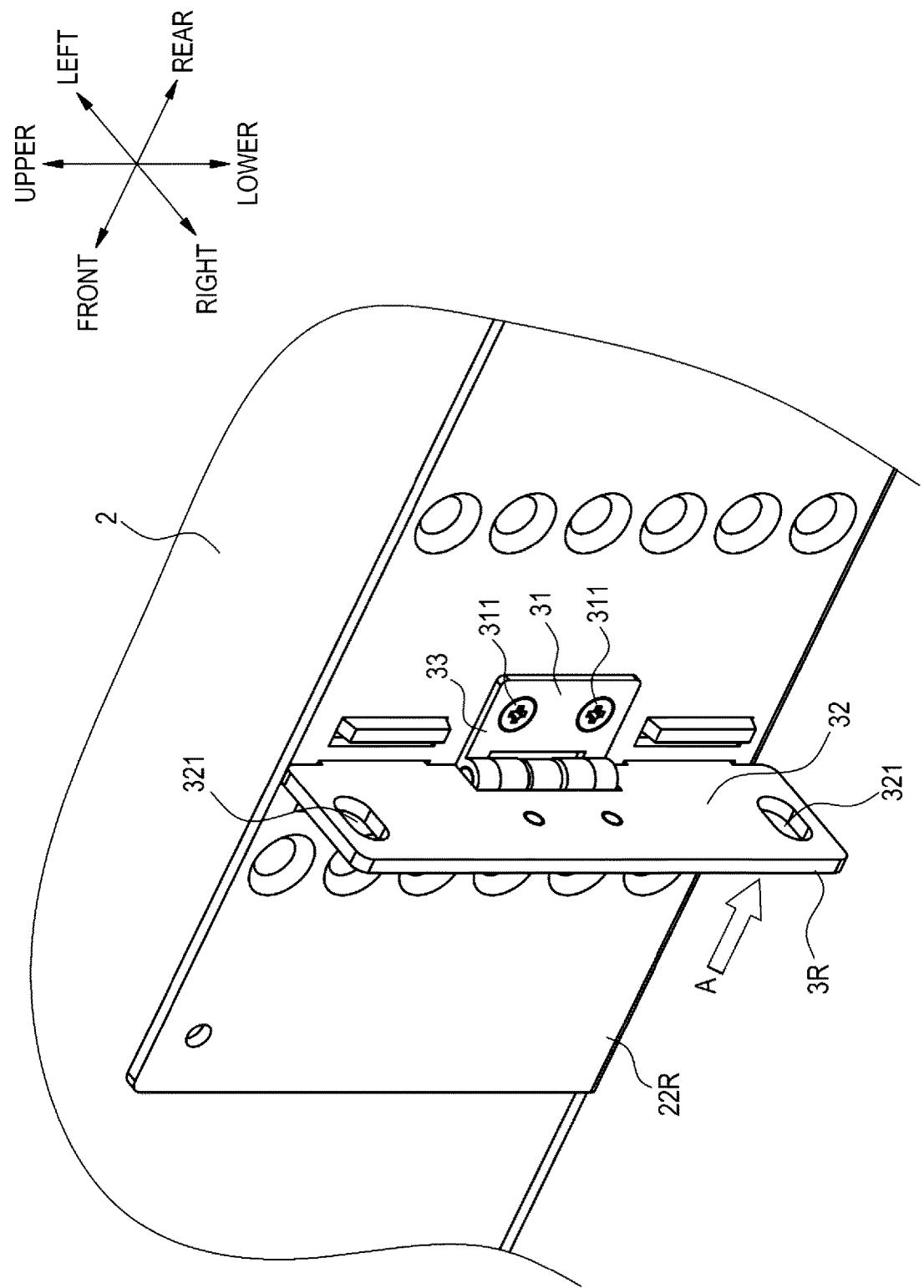
FIG. 3 is a perspective view of a bracket attached to a housing of the optical component housing box.

FIG. 3 is a perspective view showing the bracket 3R in a state of being attached to the side plate 22R of the housing 2. The bracket 3L attached to the side plate 22L has the same attachment form as the bracket 3R, and thus the bracket 3R will be described hereinafter.

As illustrated in FIG. 3, the bracket 3R includes a fixing portion 31 fixed to the side plate 22R of the housing 2, an attachment portion 32 configured to be attached to the support pillar 101f of the rack 100, and a hinge portion 33 configured to move the attachment portion 32 relative to the fixing portion 31. The fixing portion 31 is screwed and fixed to the side plate 22R of the housing 2 through screw holes 311 provided in the fixing portion 31. The attachment portion 32 is screwed and fixed to the support pillar 101f of the rack 100 through screw holes 321 provided in the attachment portion 32.

In a state in which the fixing portion 31 is fixed to the side plate 22R, the bracket 3R is changeable, via the hinge portion 33, between a state in which the attachment portion 32 stands up relative to the fixing portion 31 (state in FIG. 3) and a state in which the attachment portion 32 falls down toward a fixing portion 31 side to overlap the fixing portion 31. In the normal state in which no load is applied to the bracket 3R externally, the attachment portion 32 stands up relative to the fixing portion 31 as illustrated in FIG. 3. When a load is applied to the bracket 3R externally, for example, in a direction of an arrow A, the attachment portion 32 moves about the hinge portion 33 as a rotation shaft and falls toward the fixing portion 31 side.

Figure 4A:
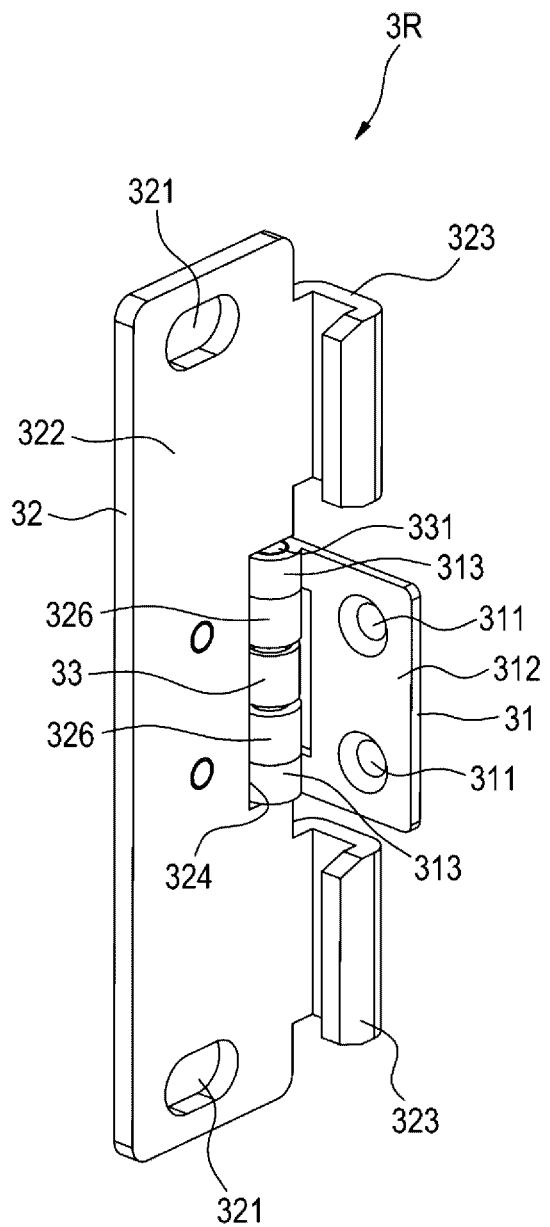
FIG. 4A is a perspective view of the bracket when viewed from a rear surface side.
Figure 4B:
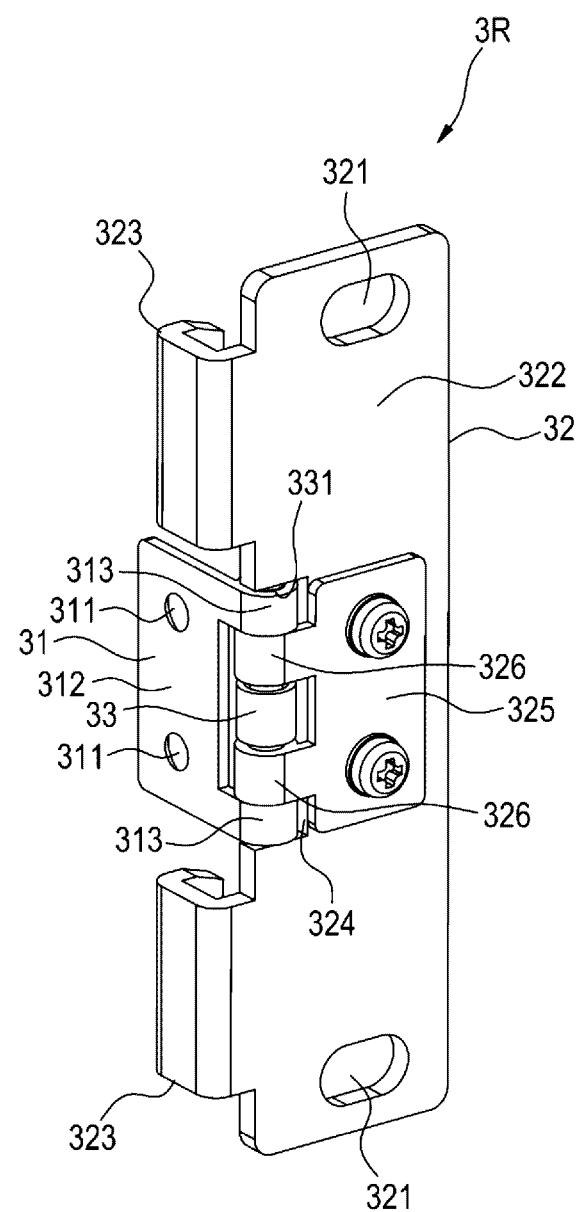
FIG. 4B is a perspective view of the bracket when viewed from a front surface side.

FIGS. 4A and 4B illustrate a configuration of the bracket 3R in detail. Specifically, FIG. 4A is a perspective view of the bracket 3R when viewed from a rear surface side, and FIG. 4B is a perspective view of the bracket 3R when viewed from a front surface side.

As illustrated in FIGS. 4A and 4B, the fixing portion 31 of the bracket 3R includes a flat plate-shaped fixing plate 312 and a tubular shaft tube 313 provided at a side portion of the fixing plate 312.

The fixing portion 31 is fixed to the side plate 22R of the housing 2 through the screw holes 311 formed in the fixing plate 312.

The shaft tube 313 is a tube through which a core rod 331, which is a rotation shaft when the attachment portion 32 moves relative to the fixing portion 31, is inserted, and constitutes a part of the hinge portion 33.

The attachment portion 32 of the bracket 3R includes a flat plate-shaped attachment plate 322, U-shaped engagement portions 323 provided at a side portion of the attachment plate 322, a concave portion 324 provided at the side portion of the attachment plate 322, a flat plate-shaped connection plate 325 fixed to the attachment plate 322, and a tubular shaft tube 326 provided at a side portion of the connection plate 325.

The attachment portion 32 is fixed to the support pillar 101f of the rack 100 via the screw holes 321 formed in the attachment plate 322.

Each of the engagement portions 323 has a shape curved in a U shape from an end portion of the attachment plate 322 on a hinge portion 33 side of the bracket 3R. For example, in a state in which the bracket 3R is fixed to the side plate 22R of the housing 2 and the attachment portion 32 stands up relative to the fixing portion 31, each of the engagement portions 323 has a shape curved in a U shape from the end portion of the attachment plate 322 on a housing 2 side. The engagement portions 323 are provided at both end portions of the attachment plate 322 along the side portion of the attachment plate 322. The two engagement portions 323 are provided to both sides of the fixing portion 31 so that the fixing portion 31 is interposed substantially in the middle. The engagement portions 323 engage with the side plate 22R of the housing 2 when the attachment portion 32 moves relative to the fixing portion 31 and stands up.

The concave portion 324 is provided between the two engagement portions 323 and is formed in, for example, a U shape. The shaft tube 326 of the connection plate 325 and the shaft tube 313 of the fixing plate 312 are accommodated in the concave portion 324 in a state in which the core rod 331 is inserted through the shaft tube 313 and the shaft tube 326.

The connection plate 325 is a member that connects the attachment plate 322 to the fixing portion 31 via the hinge portion 33. The connection plate 325 is fixed to the attachment plate 322 by screws.

The shaft tube 326 is a tube through which the core rod 331, which serves as the rotation shaft when the attachment portion 32 moves relative to the fixing portion 31, is inserted, and constitutes a part of the hinge portion 33.

The hinge portion 33 of the bracket 3R includes the shaft tube 313 provided to the fixing plate 312, the shaft tube 326 provided to the connection plate 325, and the core rod 331 inserted through the shaft tube 313 and the shaft tube 326. When the shaft tube 326 provided to the connection plate 325 rotates around the core rod 331, the attachment portion 32 moves relative to the fixing portion 31. The hinge portion 33 has a spring structure that biases the attachment portion 32 to stand up relative to the fixing portion 31. Due to the biasing of the spring structure, the attachment portion 32 stands up relative to the fixing portion 31 in the normal state in which no load is applied to the bracket 3R externally. Although not illustrated, for example, a structure in which a coil spring is wound around the core rod 331 or a plate spring can be used as the spring structure.

FIG. 5 is a perspective view of the side plate 22R of the housing 2 to which the bracket 3R is to be attached. As illustrated in FIG. 5, the side plate 22R has engagement holes 221, 222 engageable with the engagement portions 323 of the bracket 3R. Holding plates 223 to be held by the engagement portions 323 are formed between the engagement holes 221, 222. The bracket 3R is engaged with the engagement holes 221, 222 of the side plate 22R in a state in which the holding plates 223 of the side plate 22R are held in a U-shaped curve of the engagement portions 323 curved in a U-shape. The side plate 22R is formed with screw holes 224 by which the fixing plate 312 of the bracket 3R is screwed.

Next, engagement states of the engagement portions 323 of the bracket 3R and the engagement holes 221, 222 of the side plate 22R in different rising states of the bracket 3R attached to the side plate 22R will be described with reference to FIGS. 6 to 8.

Figure 6A:
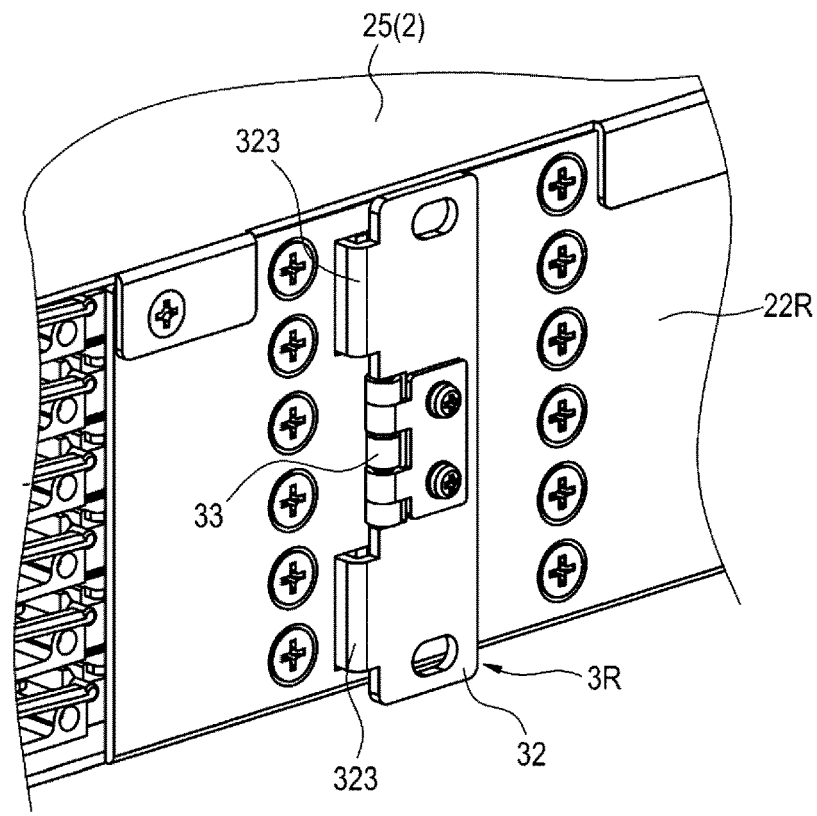
FIG. 6A illustrates an engagement portion in a state in which an attachment portion of the bracket has fallen.
Figure 6B:
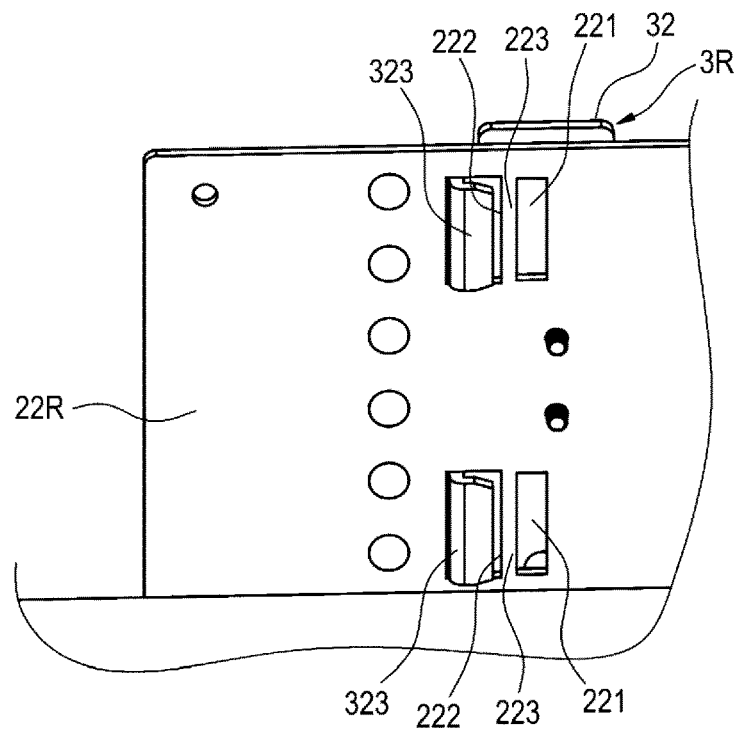
FIG. 6B illustrates the state of FIG. 6A viewed from inside the housing.

FIG. 6A illustrates a state in which the hinge portion 33 is closed and the attachment portion 32 of the bracket 3R attached to the side plate 22R has fallen to the fixing portion 31 side when viewed from outside the housing 2, and FIG. 6B illustrates the state of FIG. 6A when viewed from inside the housing 2.

As illustrated in FIGS. 6A and 6B, in the state in which the attachment portion 32 has fallen to the fixing portion 31 side, the engagement portions 323 of the attachment portion 32 are disposed in the engagement holes 222 of the side plate 22R, and are not engaged with the engagement holes 221. That is, the holding plates 223 of the side plate 22R are not held in the U-shaped curve of the engagement portions 323 curved in a U shape.

Figure 7A:
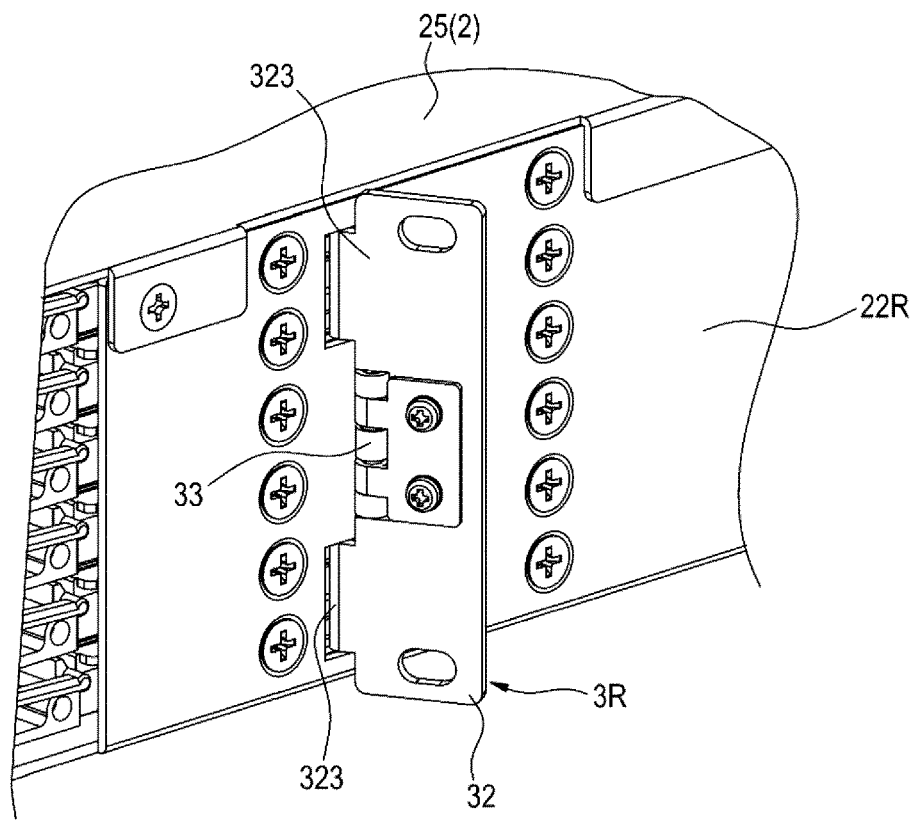
FIG. 7A illustrates the engagement portion in a state in which the attachment portion of the bracket is rising.
Figure 7B:
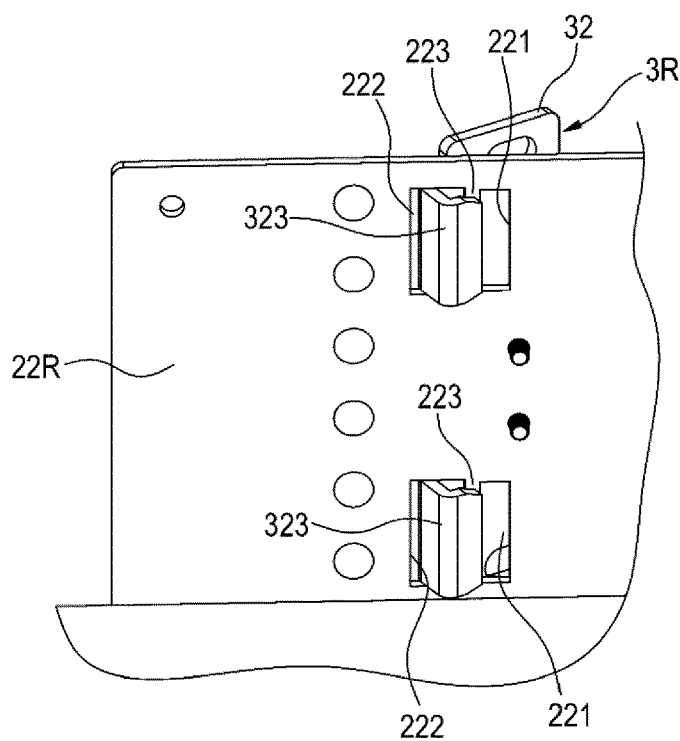
FIG. 7B illustrates the state of FIG. 7A viewed from inside the housing.

FIG. 7A illustrates a state in which the attachment portion 32 of the bracket 3R attached to the side plate 22R is rising when viewed from outside the housing 2, and FIG. 7B illustrates the state of FIG. 7A when viewed from inside the housing 2.

As illustrated in FIGS. 7A and 7B, in the state in which the attachment portion 32 is rising, the engagement portions 323 of the attachment portion 32 move along with the rising of the attachment portion 32 from inside the engagement holes 222 of the side plate 22R toward the engagement holes 221 by an amount corresponding to a rising amount of the attachment portion 32. However, the engagement portions 323 are not engaged with the engagement holes 221, and the holding plates 223 of the side plate 22R are not held in the U-shaped curve of the engagement portion 323 curved in a U shape.

Figure 8A:
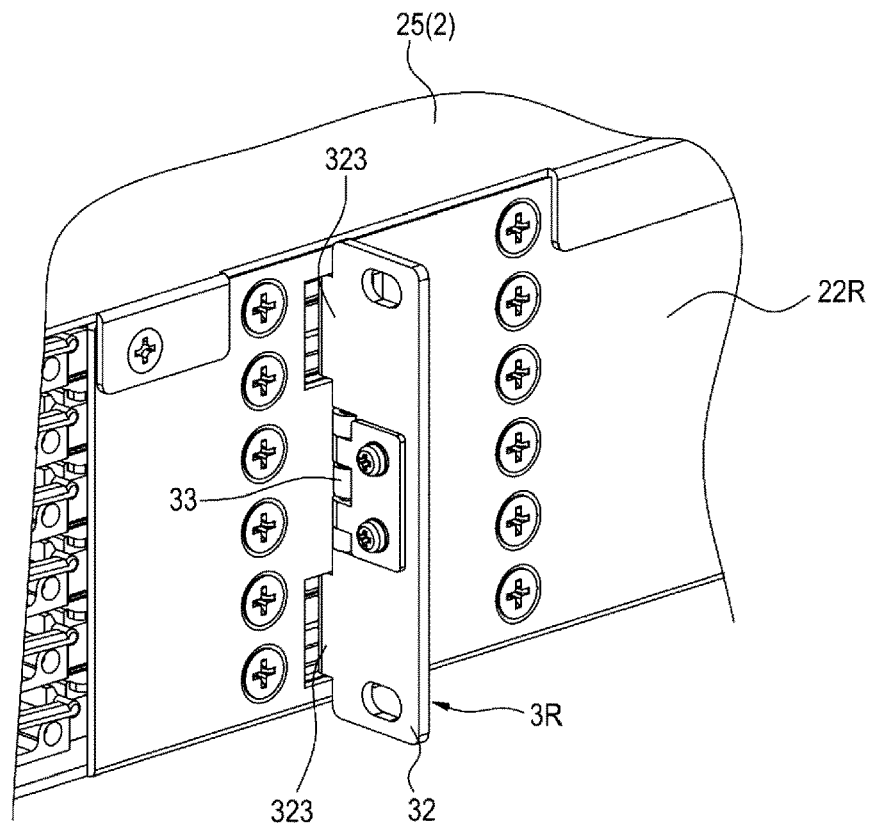
FIG. 8A illustrates the engagement portion in a state in which the attachment portion of the bracket has stood up.
Figure 8B:
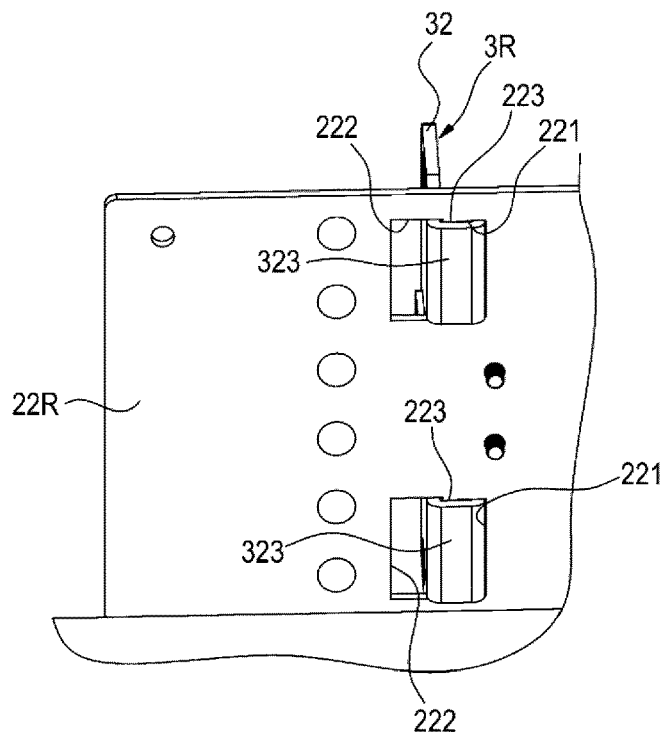
FIG. 8B illustrates the state of FIG. 8A viewed from inside the housing.

FIG. 8A illustrates a state in which the hinge portion 33 is opened and the attachment portion 32 of the bracket 3R attached to the side plate 22R has stood up when viewed from outside the housing 2, and FIG. 8B illustrates the state of FIG. 8A when viewed from inside the housing 2.

As illustrated in FIGS. 8A and 8B, in the state in which the attachment portion 32 has stood up, the attachment portion 32 stands up at approximately 90 degrees relative to the side plate 22R of the housing 2. As the attachment portion 32 stands up, the engagement portions 323 of the attachment portion 32 further move from inside the engagement holes 222 of the side plate 22R toward the engagement holes 221 and come into a state of extending from the engagement holes 222 to the engagement holes 221 and engaged with the engagement holes 222 and the engagement holes 221. That is, the holding plates 223 of the side plate 22R are held in the U-shaped curve of the engagement portions 323 curved in a U shape.

Next, a method for attaching the optical component housing box 1 to the rack 100 will be described with reference to the drawings as appropriate.

In FIG. 1, the optical component housing box 1 is attached from the rear side of the rack 100. The optical component housing box 1 passes between the support pillars 101b at the rear portion of the rack 100 with a front surface side (front plate 23 side) of the housing 2 at the front, and is inserted into the rack 100 from the rear side of the rack 100 toward the front side. As described above, the support pillars 101b at the rear portion of the rack 100 are substantially I-shaped, and the width between the support pillars 101b is larger than the width between the support pillars 101f at the front portion of the rack 100. For this reason, when the optical component housing box 1 passes between the support pillars 101b at the rear portion of the rack 100, attachment portions 32 of the brackets 3L, 3R attached to the side plates 22L, 22R of the housing 2 do not abut against the support pillars 101b. As a result, the optical component housing box 1 is inserted into the rack 100 between the support pillars 101b without being hindered by the support pillars 101b.

The optical component housing box 1 inserted between the support pillars 101b is moved toward the front side of the rack 100 while the housing 2 is kept in a horizontal state, and passes between the support pillars 101f at the front portion of the rack 100. When the optical component housing box 1 passes between the support pillars 101f at the front portion of the rack 100, the attachment portions 32 of the brackets 3L, 3R attached to the side plates 22L, 22R of the housing 2 abut against the support pillars 101f at the front portion of the rack 100. The attachment portions 32 abutting against the support pillars 101f receive a load in the direction of the arrow illustrated in FIG. 3 and hinge portions 33 are closed so that the attachment portions 32 move and fall toward the fixing portion 31 side. Here, a direction in which the hinge portions 33 are closed, that is, a direction in which the attachment portions 32 fall is a side (back surface) through which the optical component housing box 1 (housing 2) is inserted into the rack 100. For this reason, the optical component housing box 1 can pass between the support pillars 101f without being hindered by the support pillars 101f. After the brackets 3L, 3R pass between the support pillars 101f at the front portion, no external load is applied to the attachment portions 32. Accordingly, the attachment portions 32 are in a state of standing up relative to fixing portions 31 by a biasing force of the spring structure of the hinge portions 33.

The optical component housing box 1 is fixed to the rack 100 in a state in which the brackets 3L, 3R pass between the support pillars 101f at the front portion and move to front sides of the support pillars 101f. The optical component housing box 1 is fixed by overlapping the attachment portions 32 of the brackets 3L, 3R with the front sides of the front support pillars 101f and screwing the attachment portions 32 by inserting a screw into the screw holes 102 of the front support pillars 101f via the screw holes 321 of the attachment portions 32. The attachment portions 32 can be screwed to the support pillars 101f from a front surface side of the rack 100 toward the support pillars 101f. When the attachment portions 32 of the brackets 3L, 3R are fixed to the support pillars 101f of the rack 100, the housing of the optical component housing box 1 to the rack 100 is completed.

When an optical component housing box including fixed L-shaped brackets on side surfaces is attached to a rack, it is general to attach protruding portions of the L-shaped brackets to support pillars of the rack by screws. However, in a case of the optical component housing box having such a configuration, the protruding portions of the brackets protrude outward from the side surfaces of a housing. Accordingly, the protruding portions cannot pass between the support pillars of the rack. For this reason, in order to house the optical component housing box in the rack, it is necessary for the housing part of the optical component housing box to be inserted between the support pillars from a front surface side of the rack, and the brackets to be screwed and fixed on front sides of the support pillars of the rack without the protruding portions of the brackets passing between the support pillars of the rack. However, in recent years, there is an increasing demand for an optical component housing box in which optical cables are connected in advance, an optical component housing box whose size on a rear surface side is larger than the width between support pillars of a rack, an optical component housing box including a protruding portion on a rear surface side, and the like, and it has been difficult to house these optical component housing boxes from a front surface side of a rack.

In contrast, the optical component housing box 1 according to the above-described embodiment includes: the housing 2 in which optical components are housed; and the bracket 3 attached to the side surface of the housing 2, the bracket 3 including: the fixing portion 31 fixed to the housing 2, the attachment portion 32 configured to be screwed to one of the plurality of screw holes 102 opened in the support pillars 101f provided on both sides of the rack 100, and the hinge portion 33 for moving the attachment portion 32 relative to the fixing portion 31. When attaching the optical component housing box 1 to the rack 100, after the bracket 3 passes between the support pillars 101f by the hinge portion 33 being closed and the attachment portion 32 falling to the fixing portion 31 side, the housing 2 is moved into the rack 100 from a side opposite to a direction in which the attachment portions 32 are screwed to the support pillar 101f, the attachment portion 32 is attached to the support pillar 101f in a state of standing up relative to the fixing portion 31. According to this configuration, it is possible to insert the optical component housing box 1 into the rack 100 from a side (usually a direction from the rear portion of the rack 100 to the front portion) opposite to the direction (usually a direction from the front portion of the rack 100 to the rear portion) in which the attachment portion 32 of the bracket 3 is screwed to the rack 100, and to move the inserted optical component housing box 1 to the front surface side of the rack 100. As a result, for example, an optical component housing box in which optical cables are connected in advance, an optical component housing box whose size on a back surface side of the support pillars 101*f* is larger than the width between the support pillars 101*f*, an optical component housing box including a protruding portion on a back surface side, and the like can be housed and attached to the rack 100. Therefore, there are few restrictions on the width dimension and an additional function of the optical component housing box 1 when housing the optical component housing box 1 in the rack 100.

According to the optical component housing box 1 in the present embodiment, the attachment portion 32 includes: the flat plate-shaped attachment plate 322 configured to be fixed to the rack 100; and the engagement portion 323 curved in a U shape from the end portion of the attachment plate 322 on the housing 2 side, the housing 2 has the engagement hole 221 engageable with the engagement portion 323, and the engagement portion 323 is not engaged with the engagement hole 221 when the hinge portion 33 is closed and the attachment portion 32 falls to the fixing portion 31 side, and is engaged with the engagement hole 221 when the hinge portion 33 is opened and the attachment portion 32 stands up. According to this configuration, since the engagement portion 323 of the attachment portion 32 is engaged with the engagement hole 221 of the housing 2 when the attachment portion 32 stands up, a part of the weight of the housing 2 can be applied to the engagement portion 323 engaged with the housing 2 when the attachment plate 322 of the attachment portion 32 is fixed to the support pillar 101*f* of the rack 100. As a result, the weight of the housing 2 can be received by the fixing portion 31 and the attachment portion 32 (engagement portion 323) of the bracket 3 in cooperation with each other, and thus the housing 2 can be reliably and firmly held by the bracket 3 as compared with a case where the weight of the housing 2 is received by only the fixing portion 31.

According to the optical component housing box 1 in the present embodiment, the hinge portion 33 has a spring structure that biases the attachment portion 32 to stand up relative to the fixing portion 31. According to this configuration, when the optical component housing box 1 is inserted from the rear side of the rack 100 and the bracket 3 pass between the support pillars 101*f*, the attachment portion 32 can receive the pressure from the support pillar 101*f* and fall to the fixing portion 31 side against the spring structure of the hinge portion 33. After the bracket 3 passes between the support pillars 101*f*, the attachment portion 32 can automatically stand up. For this reason, the workability of attaching the optical component housing box 1 can be improved particularly in a case where a worker works alone.

According to the optical component housing box 1 in the present embodiment, the hinge portion 33 is closed and the attachment portion 32 falls to the rear side when the housing 2 moves from the rear portion of the rack 100 toward the front portion thereof. According to this configuration, when the optical component housing box 1 is inserted into the rack 100, the attachment portion 32 abutting against the support pillar 101*f* of the rack 100 can smoothly fall to the fixing portion 31 side. As a result, the attachment workability can be further improved.

Although the present disclosure has been described in detail and with reference to specific embodiment, it will be apparent to those skilled in the art that various changes and modifications can be made without departing from the spirit and scope of the present disclosure. The number, positions, shapes, and the like of the components described above are not limited to the above-described embodiment, and can be changed to suitable numbers, positions, shapes, and the like for implementing the present disclosure.

In the above-described embodiment, although the hinge portion 33 has a spring structure, the hinge portion 33 may not have a spring structure. Even in this case, the attachment portion 32 of the bracket 3 is changeable between the state in which the attachment portion 32 stands up relative to the fixing portion 31 and the state in which the attachment portion 32 falls toward the fixing portion 31 side.

For example, the hinge portion 33 may be temporarily fixed by an adhesive tape or the like in advance so that the hinge portion 33 is in a closed state, and after the optical component housing box 1 is inserted from the rear side of the rack 100, the hinge portion 33 may be raised by removing the adhesive tape or the like. Of course, in a case where the size of the optical component housing box 1 on the rear surface side is smaller than the width between rack support pillars, it is also possible to insert the optical component housing box 1, with the hinge portion 33 fixed standing, from the front surface side of the rack 100 and fix the bracket 3 to the post pillar 101*f* of the rack 100, as is in the related art.

In addition, the attachment portion 32 of the bracket 3 may not only fall to the fixing portion 31 side relative to the fixing portion 31 but also to a side opposite to the fixing portion 31 side. In this configuration, even when the attachment portion 32 falls to the side opposite to the fixing portion 31 side, the bracket 3 can pass between the support pillars 101*f*. For this reason, the optical component housing box 1 can be housed in or taken out from the rear side of the rack 100.

In the above-described embodiment, although the attachment portion 32 of the bracket 3 includes two engagement portions 323, the present disclosure is not limited thereto. The attachment portion 32 may include at least one engagement portion 323. Also in this case, the housing 2 can be reliably held by the bracket 3. However, as illustrated in the drawings, by providing the engagement portions 323 to both sides of the fixing portion 31 with the fixing portion 31 interposed therebetween, the housing 2 can be reliably held by the bracket 3.

Further, as illustrated in FIG. 2, although the brackets 3L, 3R are attached in positions slightly forward of middle portions of the side plates 22L, 22R of the housing 2 in a front-rear direction, the positions of the brackets 3L, 3R are not limited to these positions. For example, the positions of the brackets 3L, 3R may be further forward of or rearward of the positions illustrated in FIG. 2.

What is claimed is:

1. An optical component housing box configured to be housed in a rack, the optical component housing box comprising:
a housing in which an optical component is housed; and
a bracket attached to a side surface of the housing, the bracket including:
a fixing portion fixed to the housing;
an attachment portion configured to be screwed into one of a plurality of screw holes opened in support pillars provided on both sides of the rack; and
a hinge portion configured to move the attachment portion relative to the fixing portion,
wherein when attaching the optical component housing box to the rack, after the bracket passes between the support pillars by the hinge portion being closed and the attachment portion falling to a fixing portion side as the housing is moved into the rack from a side opposite to a direction in which the attachment portion is to be screwed to the support pillar, the attachment portion is attached to the support pillar in a state of standing up relative to the fixing portion.

2. The optical component housing box according to claim 1,
wherein the attachment portion includes:
a flat plate-shaped attachment plate configured to be fixed to the rack; and
an engagement portion curved in a U shape from an end portion of the attachment plate on a housing side,
the housing may have an engagement hole engageable with the engagement portion, and
wherein the engagement portion does not engage with the engagement hole when the hinge portion is closed and the attachment portion falls to the fixing portion side, and engages with the engagement hole when the hinge portion is opened and the attachment portion stands up.

3. The optical component housing box according to claim 2,
wherein the attachment portion includes at least one engagement portion.

4. The optical component housing box according to claim 1,
wherein the hinge portion has a spring structure that biases the attachment portion to stand up relative to the fixing portion.

* * * * *